United States Patent [19]

Midgley

[11] Patent Number: 4,476,742

[45] Date of Patent: Oct. 16, 1984

[54] HAND GRIP

[76] Inventor: Noel H. Midgley, 361 Dandenong Rd., Armdale, Victoria 3143, Australia

[21] Appl. No.: 339,444

[22] PCT Filed: May 19, 1981

[86] PCT No.: PCT/AU81/00061

§ 371 Date: Jan. 8, 1982

§ 102(e) Date: Jan. 8, 1982

[87] PCT Pub. No.: WO81/03284

PCT Pub. Date: Nov. 26, 1981

[30] Foreign Application Priority Data

May 23, 1980 [AU] Australia ............................ PE3698

[51] Int. Cl.[3] ........................ B62K 21/26; B32B 3/30; B32B 7/04

[52] U.S. Cl. ................................ 74/551.9; 273/81 D; 273/75; 16/DIG. 12; 428/167; 428/182

[58] Field of Search ....................... 428/167, 156, 182; 273/81 D, 75; 74/551.9, 558; 16/DIG. 12

[56] References Cited

U.S. PATENT DOCUMENTS

| | | | |
|---|---|---|---|
| 2,671,660 | 3/1954 | Goodwin . | |
| 3,489,031 | 1/1970 | Meier | 273/75 |
| 3,779,123 | 12/1973 | Chafee . | |
| 4,152,475 | 5/1979 | Haley | 428/906 X |

FOREIGN PATENT DOCUMENTS

| | | | |
|---|---|---|---|
| 417167 | 6/1970 | Australia . | |
| 470649 | 3/1976 | Australia . | |
| 832882 | 10/1938 | France | 74/551.9 |
| 913609 | 9/1946 | France | 74/551.9 |
| 11306 | of 1892 | United Kingdom | 74/551.9 |
| 1535689 | 12/1978 | United Kingdom . | |
| 2057894A | 4/1981 | United Kingdom | 278/75 |

*Primary Examiner*—Alexander Thomas
*Attorney, Agent, or Firm*—Cushman, Darby & Cushman

[57] ABSTRACT

A tape (6) for forming a hand grip (8) on the handle of sporting equipment, hand tools and the like including a method and serrated tool for making the tape. Hand grips on the handle of such devices become wet and slippery from perspiration, however, the present tape minimizes the problem. The tape (6) has upper and lower surfaces provided with substantially complementary longitudinally extending ridges (10) and grooves (9). The serrated tool has a front face (20), a rear face (21) and a cutting edge (22) comprising teeth (23). The method involves rotation of a disc of material relative to the serrated tool to peel tape (6) from the disc. A hand grip (8) may be formed from the tape (6) by helically winding the tape onto the handle portion.

5 Claims, 5 Drawing Figures

HAND GRIP

The present invention relates to grips for sporting equipment, hand tools and other articles generally gripped by hand during use and to aspects of the preparation thereof. The invention will be described by way of example only with reference to the preferred application to a sporting racquet or the like. However, it should be understood that the present invention is applicable to the provision of grips for other applications and the invention is in no way restricted to the example application described hereafter.

It is known to provide a sporting racquet with a grip made of a strip of leather helically wound around a handle portion of the racquet. Prior to the application of such a strip to the handle portion the latter is coated with an adhesive and the edges of the leather strip are bevelled. After the leather strip is wound onto the handle portion the bevelled edges form depressions which extend helically along the handle portion to provide areas to which the fingers of the user may fit to provide a suitable grip. During use such a leather strip tends to deteriorate and absorb moisture.

Another known grip comprises a moulded rubber sleeve which may be slipped over the shaft or handle portion of the racquet. The sleeve is attached to the handle portion by an adhesive. However, it is difficult to apply a tight fitting sleeve over a handle and during use perspiration reduces the surface friction of the outer surface of the sleeve and such prior art grips become slippery.

To overcome these problems it has been proposed to apply a sticky substance to the hands and/or grips or alternatively to wrap a sticky tape around the handle portion of the racquet. These proposals are far from satisfactory and provide only temporary solutions to the problem caused by perspiration during use.

Accordingly, it is an object of the present invention to provide in one embodiment of the invention an improved grip for handle portions of racquets and like equipment.

It is a further object to provide in another embodiment of the invention tape for forming a hand grip.

It is yet another object to provide in a further embodiment of the invention a method of making tape for hand grips and to provide a cutting tool useful in the method of making the tape.

According to one embodiment, the present invention provides tape for forming a hand grip characterised in that the tape has upper and lower surfaces provided with substantially complementary, longitudinally extending grooves and ridges.

According to another embodiment, the invention provides a hand grip on the handle portion of sporting equipment, a hand tool or other article generally gripped by hand during use characterised in that a length of tape according to the invention is helically wound onto the handle portion and affixed thereto. Preferably a portion of one longitudinal edge of the tape overlaps a portion of the opposite longitudinal edge thereof whereby grooves and ridges on the upper surface of the tape engage complementary ridges and grooves on the lower surface of the tape.

In yet another embodiment the invention provides a method of making tape for hand grips characterised by the steps of providing a disc of tape material and peeling a strip of tape from the outer periphery of the disc by rotating the disc relative to a cutting tool held against the outer periphery of the disc. Whilst it is preferred that the disc be rotated and the cutting tool be stationary, the reverse could also be the case. Alternatively, both the disc and cutting tool may both move.

In another embodiment, the invention provides a serrated cutting tool characterised in that the tool has a front face and a rear face and a serrated cutting edge, the front face having a series of longitudinally extending grooves terminating at the cutting edge to form a plurality of cutting teeth.

Preferred embodiments of the invention will now be described by way of example with reference to the accompanying drawings in which.

Figure 1:
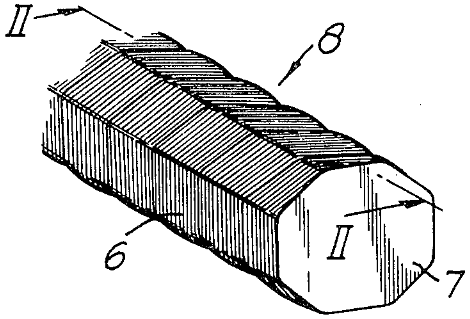
FIG. 1 is a perspective view showing the handle portion of a racquet having a grip according to the invention.

According to one embodiment the invention provides a tape 6 suitable for application to the handle portion 7 of a racquet to form a grip 8. The tape 6 provided by the invention may be made from any suitable materials such as leather, rubber, plastics or the like or any combinations of one or more of these materials. In a preferred form of the invention the tape may be made from a porous cellular rubber or plastics material. The material may be subjected to pretreatments such as pre-shrinking or ultraviolet stabilization and may contain anti-oxidants. The material from which the tape is made may be of any suitable thickness. A thickness between 0.5 mm and 2.5 mm has been found most suitable. Preferably the tape is about 1.6 mm in thickness although other thicknesses may also be employed for forming grips.

The upper and lower surfaces of the tape may be provided with surface embellishments such as stripes or the like. Surface embellishments, if adopted, may be chosen for asthetic reasons or may be in the form of advertising material or any other desired marking.

The upper and lower surfaces of the tape are provided with complimentary, longitudinally extending grooves 9 and ridges 10. The grooves 9 and ridges 10 may be arranged so that they extend from an edge at least partway laterally across the tape 6. The grooves and ridges on the upper surface of the tape are arranged so that they are substantially complementary to the grooves and ridges on the lower surface of the tape. That is, when the tape is folded back upon itself so that the upper surface contacts the lower surface as would be the case when the tape is partially overlapped in being helically wound around the handle portion of the racquet, the grooves and ridges on one surface engage the grooves and ridges provided on the other surface of the tape. The cross-sectional shape of the grooves and ridges may be varied in accordance with the invention. For example the grooves may be V-shaped, channel shaped, curved or of another profile. Similarly, the ridges may be of varying shapes. As shown in FIG. 3 the grooves and ridges are arcuate. This provides a choice of surface texture in the resultant grip by having a desired one of the tape surfaces uppermost when wound onto the handle portion. The tape 6 may be applied as in FIGS. 2 and 3 with the convex side of the arcuate elements outermost. Alternatively tape 6 may be applied with the concave side outermost. In this latter configuration the hand of the user contacts the sharper ridges separating adjoining arcuate elements. Thus there is a greater valley area for conducting perspiration away from the user's hand in this configuration. However, the feel is generally harsher than that of the alternative configuration shown in the drawings where the ridges in contact with the user's hand are more rounded and hence give the grip a softer feel.

Both configurations have been found to perform satisfactorily and the personal preference of the user may conveniently determine which side of the grip tape should face outwardly after application of the tape to a racquet or other item.

The grooves extending longitudinally along both surfaces of the tape enable the tape to be wound onto the handle portion of the racquet either in a tight or loose helix. That is to say, that the convolutions formed as the tape is helically wound may be closely spaced by overlapping the tape as it is wound for a substantial part of its width. To obtain different spacing of the convolutions of the helix the tape may be wound so that it does not overlap to such an extent.

The winding of the tape 6 in this fashion results in the production of a double thickness 12 of the tape extending helically along the handle portion of the racquet. Between this helically extending double thickness portion 12 a depressed region comprising a single thickness 13 of tape is formed. This depressed region also extends helically along the handle portion and forms a groove to accomodate the fingers of the hand gripping the racquet. This finger accomodating groove may be varied in width by varying the degree of overlap of the tape as it is wound onto the handle portion. In addition by reversing the direction of the helix relative to the racquet head the depressed region may be in the form of either a left or a right-handed helix thereby providing an alternative arrangement of finger depressions for different users.

The grooves 9 provided on the upper and lower surfaces of the tape may be of any suitable depth. The grooves may be arranged to extend longitudinally along the tape at spaced intervals laterally across the tape. These grooves provide built-in traction which prevents the hand from slipping along the handle portion of the racquet. These grooves also provide a reservoir and channel to allow perspiration and other moisture to flow away from the hand so that this moisture does not adversely affect the area of grip surface being held. The presence of these grooves 9 and ridges 10 also has the advantage of providing an increased surface area from which moisture is readily evaporated when the racquet is not in use. In addition, when a material such as cellular rubber or plastics is used to make the tape, the base material does not absorb any appreciable amount of moisture during use of the racquet. As the grooves and ridges provide an increased surface area across the tape, any moisture clinging to the surface of the grip is readily wiped off during use. Alternatively such moisture readily evaporates during non-use of the racquet. This may further be enhanced by roughening the surface of the grooves and ridges. By using a material such as closed cell, microcellular rubber which does not absorb moisture the grip cannot become saturated during use. Thus when wiped dry it is as dry as before use whereas a leather grip for example still retains moisture after wiping and can take a long time to fully dry out.

Figure 2:
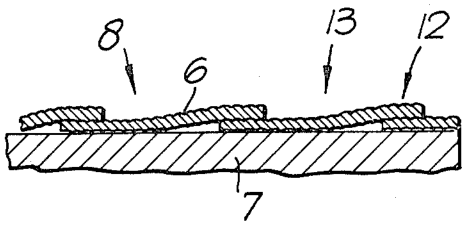
FIG. 2 is an expanded fragmentary cross-sectional view taken along line II—II of FIG. 1.
Figure 3:
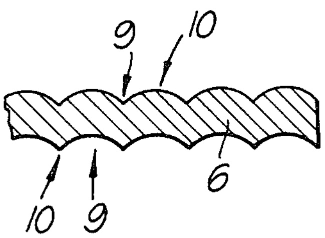
FIG. 3 is an expanded fragmentary cross-sectional view showing the configuration of tape according to the invention.

As mentioned above the grip tape 6 provided by the present invention is helically applied to the handle portion of a racquet as shown in FIGS. 1 and 2. If desired this handle portion may be at least partially coated with an adhesive such as a contact adhesive. With the tape of the present invention it is not necessary to fix the tape to the handle portion along the total surface area of the handle portion. This is so because of the interlocking nature of the complementary grooves and ridges provided on the tape. For example, only the ends of the tape need be attached to the handle portion of the racquet by an adhesive or any other suitable means for securing the tape to the handle portion. The tape intermediate the two ends tends to remain in place because of the interlocking grooves and ridges. If desired the total area of the handle portion may be coated with an adhesive and then the wrapping tape of the invention may be applied to it. Whilst it is preferred to form a grip by overlapping a portion of the tape as described above, it is to be appreciated that a grip may also be formed in accordance with the invention by winding the tape in a helix in which the marginal edges do not overlap.

Some particularly preferred physical parameters of materials which are considered useful for producing a tape according to the invention include:

(a) Density of between 0.35 and 0.55 g/cm$^3$ (b) Shrinkage not more than 10% at 100° C. for one hour (c) Tensile strength between 20 and 40 kg/cm$^2$ (d) Elongation at break between 100 and 300%, and (e) Tear strength between 10 and 30 kg/cm width.

As can be appreciated by those skilled in the art a variety of materials of varying physical and chemical properties may be advantageously employed in accordance with the present invention.

In one embodiment, the invention provides a method for producing the tape of the invention. The method may include the steps of providing a disc of tape material, the thickness of the disc corresponding to the intended tape width, and peeling a strip of tape from the outer periphery of the disc by rotating the disc relative to the cutting tool held against the outer periphery of the rotating disc.

The disc may be cut or stamped from a sheet of tape material. To provide multi-coloured tape a plurality of layers of different coloured materials may be laminated to form a sheet from which the disc may be cut. A laminating adhesive may be employed. Preferably the adhesive is a contact adhesive which is not reactivatable. Preferably the adhesive is a cross-linked thermosetting adhesive. When discs are cut or stamped from such a laminated sheet the tape so formed will then have longitudinal stripes of each of the laminates.

Discs of tape material may also be prepared by other methods. For example the discs may be moulded directly in the desired disc form to avoid cutting or stamping or different coloured layers of material may be fused during moulding or extrusion and not laminated. Other variations in the preparation of the discs are also envisaged within the scope of the present invention.

The cutting edge of the peeling knife may be applied at an angle to the outer periphery of the rotating disc. To maintain a substantially even thickness of tape the knife and the outer periphery of the disc may progressively be moved relatively towards one another. Such relative movement may be achieved by moving the knife inwardly towards the axis of rotation of the disc. In another arrangement the disc may be continuously urged against a substantially stationery knife. Arrangements in which the rotating disc and the knife both move are also envisaged as being within the scope of the invention. Whilst many speeds of disc rotation may be employed a preferred speed is within the range 500 to 5000 feet/min. More preferably the speed is between 1500–2000 feet/min.

It has been found that due to the characteristics of the preferred materials from which the tape may be made a knife with a straight cutting edge of the type used in veneering timber and the like may not be suitable for peeling tape from a disc of tape material. It has been surprisingly found however, that use of a knife with a serrated cutting edge overcomes the difficulties experienced with knives having a straight cutting edge and provides satisfactory results even with relatively soft or spongy materials. Accordingly use of a knife with a serrated cutting edge is particularly preferred.

Thus, in another embodiment the invention provides a knife or cutting tool with a serrated cutting edge for use in peeling tape from a rotating disc. Preferably the knife is substantially rectangular in transverse cross-section although other cross-sections may be employed. The knife has a front face 20 and a rear face 21. The front face, in use, faces the periphery of the rotating disc and the rear face faces away from the disc. The tape, after being peeled from the disc may pass along the rear face 21 of the knife.

Figure 4:
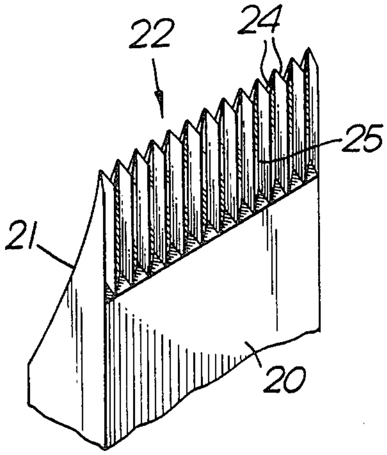
FIG. 4 is a perspective view of a cutting tool according to an embodiment of the invention; and, FIG. 5 is a perspective view of the tool of FIG. 4 showing the front face.
Figure 5:
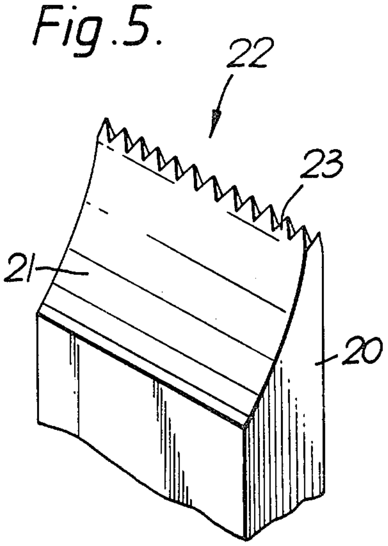

In this embodiment the cutting edge 22 comprises a series of teeth 23. As shown in FIG. 4 the teeth 23 merge into the rear face 21. The teeth 23 are preferably pyramidal in shape. Preferably the teeth 23 are sharpened to form cutting edges 24 in the vicinity of the apex of the pyramidal shape. The teeth may be triangular in cross-section. The front face of the knife may have a series of grooves 25 as shown in FIG. 5. These grooves may extend at least part way along the frontface 20. Where the teeth 23 are triangular and one face of the triangle merges with face 21, the adjacent faces combine to form the start of the grooves. Preferably the grooves are substantially V-shaped.

The knife may be hollow ground. Preferably the cutting edge 22 of the knife is substantially broader than the width of a disc whereby notwithstanding small lateral movement of the disc the periphery of the disc will continue to contact the cutting edge 22 of the knife.

The distal end of the knife may have a suitable stock for facilitating mounting of the knife in a machine to present the knife for peeling of tape from a disc.

The angle of the knife relative to the disc has not been found particularly critical although it has been found that particularly useful results may be obtained when the cutting edge is substantially tangential to the periphery.

It has been found in use that the preferred knife described above provides a tape with a somewhat roughened surface. Such a surface is particularly preferred. It is presently believed that the advantages of such a surface are due to the larger surface area in comparison with a substantially flat tape. Accordingly it is believed that moisture is more likely to be thinly spread over the surface and therefore to evaporate at a faster rate. In addition the rougher surface facilitates a better grip between the tape and a user's hand even where only a small amount of moisture is present.

The grip tape provided by the present invention and grips formed therefrom in accordance with the invention show considerable advantages over the known prior art. It will be seen for example, that the grip tape provided by the present invention may be readily wiped dry with a hand-towel and provides a good measure of traction against the hand of the user at all times whereas previously known leather or towelling grips, which are substantially flat under hand pressure, tend to become supersaturated with moisture during use.

Further, the softness of the grip which in turn offsets the comfort and traction may be varied by altering the overall thickness of the tape and/or the height of the ridges and grooves. It has been found that the ridges and/or grooves on either or both sides of the tape may deform under pressure whereby the grip can have a cushioning effect. In this way a grip formed from the tape provided acts as a shock absorber between the handle and the user's hand and may accordingly be beneficial in minimizing injuries such as tennis elbow. The complementary ridges and grooves on a tape according to the invention allow the advantages of cushioning and good grip to be achieved in a single tape.

The present invention may provide a grip for the handle portion of the racquet, hand tool or like implement, steering wheel or any other item adapted to be grasped by a hand, either during the manufacture of such item or as a replacement grip for an existing item. In the latter case the replacement grip is generally provided in the form of grip tape which may be found onto and over any existing grips or if preferred any existing grip may be removed prior to forming the new grip from the grip tape provided by the present invention.

I claim:

1. A hand grip on the handle portion of sporting equipment, hand tool or other article generally gripped by hand during use, having helically wound onto said handle and affixed thereto a length of tape with upper and lower surfaces provided with substantially complementary, longitudinally extending grooves and ridges such that a portion of one longitudinal edge of said tape overlaps a portion of the opposite longitudinal edge thereof, whereby grooves and ridges on the upper surface of said tape engage complementary ridges and grooves on the lower surface of said tape, and the grooves and ridges of the upper surface extend helically around the handle portion.

2. A hand grip according to claim 1 wherein the tape comprises a plurality of longitudinally extending strips joined together along longitudinally extending edges thereof.

3. A hand grip according to claim 2 wherein the grooves and ridges extend at least partway laterally across the tape from at least one edge thereof.

4. A hand grip according to claim 3 wherein the grooves and ridges are substantially V-shaped in cross-section.

5. A hand grip according to claim 4 wherein the tape is made of cellular rubber or plastics material.

* * * * *